United States Patent
Kamalov et al.

(10) Patent No.: US 9,998,806 B2
(45) Date of Patent: Jun. 12, 2018

(54) OVERLAPPING SPECTRUM AMPLIFICATION

(71) Applicant: Google Inc., Mountain View, CA (US)

(72) Inventors: Valey Kamalov, Gainesville, FL (US); Vijayanand Vusirikala, Palo Alto, CA (US); Vinayak Dangui, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/348,430

(22) Filed: Nov. 10, 2016

(65) Prior Publication Data

US 2018/0132016 A1   May 10, 2018

(51) Int. Cl.
*H04B 10/00* (2013.01)
*H04Q 11/00* (2006.01)
*H04B 10/2513* (2013.01)
*H04B 10/2569* (2013.01)

(52) U.S. Cl.
CPC ..... *H04Q 11/0062* (2013.01); *H04B 10/2513* (2013.01); *H04B 10/2569* (2013.01); *H04Q 11/0005* (2013.01); *H04Q 2011/0088* (2013.01)

(58) Field of Classification Search
CPC ...... H04J 14/02; H04J 14/021; H04J 14/0209; H04B 10/291; H04B 10/2918; H04B 10/2916; H04B 10/2507; H04B 10/25253; H04B 10/69; H04B 10/616; H04B 10/6163; H04B 10/6165
USPC .. 398/79, 158, 159, 147, 81, 33, 38, 34, 37, 398/173, 175, 177, 180, 181, 183, 188, 398/202, 205, 207, 208, 160, 161; 359/349, 334, 337, 341
See application file for complete search history.

(56) References Cited

U.S. PATENT DOCUMENTS 6,307,668 B1   10/2001   Bastien et al.
6,310,716 B1 *  10/2001   Evans ............... H01S 3/302
                                                    359/334

(Continued)

FOREIGN PATENT DOCUMENTS

CA   2344750 A1   10/2002
EP   1127391 A1   8/2001

OTHER PUBLICATIONS

International Search Report and Written Opinion for related Application No. PCT/US2017/053700 dated Dec. 14, 2017.

*Primary Examiner* — Hanh Phan
(74) *Attorney, Agent, or Firm* — Honigman Miller Schwartz and Cohn LLP

(57) ABSTRACT

A method for overlapping spectrum amplification includes receiving an optical signal and splitting the optical signal into a first split signal having a first wavelength band and a second split signal having a second wavelength band. The splitting results in a band gap between the first wavelength band and the second wavelength band. The method further includes delaying the first split signal by a threshold period of time relative to the second split signal and combining the first split signal and the second split signal, resulting in a combined signal having the first wavelength band and the second wavelength band without the band gap therebetween. The path difference between the first split signal along the first signal path and the second split signal along the second signal path is within a threshold multipath interference compensation range.

18 Claims, 7 Drawing Sheets

(56) References Cited

U.S. PATENT DOCUMENTS

| | | | |
|---|---|---|---|
| 6,667,829 B2* | 12/2003 | Hatami-Hanza | H01S 3/06754 359/349 |
| 6,972,899 B2 | 12/2005 | Hwang et al. | |
| 2016/0105245 A1* | 4/2016 | Cai | H04B 10/613 398/208 |

* cited by examiner

OVERLAPPING SPECTRUM AMPLIFICATION

TECHNICAL FIELD

This disclosure relates to amplification of overlapping spectrum.

BACKGROUND

Optical fiber can carry an optical signal with data on multiple frequency bands. These multiple frequency bands have differing spectra but the bandwidth of the optical cable limits the range of spectra to a finite range of frequencies. Any loss of spectra between frequency bands can result in a reduction of data able to be transmitted in the optical fiber.

SUMMARY

The present disclosure describes systems and methods for amplifying overlapping spectrum in a signal. In one aspect, a system receives an optical signal and separates the optical signal into two split signals, one that includes primarily a first spectrum (e.g., C-band) and another that includes primarily a second spectrum (e.g., L-band). The system amplifies the two split signals, compensates at least one of the split signals for any linear contribution resulting from the splitting and/or the amplification and then combines the two split signals, resulting in a combined signal having the first and second spectrums with no band gap (or substantially no band gap) therebetween. In some examples, the system includes an extended band C-band amplifier and an extended band L-band amplifier configured to amplify the respective split signals after separation of the C- and L-bands. In additional examples, the system is configured to delay one of the split signals relative to the other before combining the two split signals, so that the combined signal can be resolved by coherent detection and linear filtering.

One aspect of the disclosure provides a method for overlapping spectrum amplification. The method includes receiving an optical signal having a first wavelength band and a second wavelength band and splitting the optical signal into a first split signal having the first wavelength band and a second split signal having the second wavelength band. The splitting results in a band gap between the first wavelength band and the second wavelength band. The method also includes routing the first split signal along a first signal path and routing the second split signal along a second signal path different than the first signal path. The method further includes delaying the first split signal by a threshold period of time relative to the second split signal and combining the first split signal and the second split signal, resulting in a combined signal having the first wavelength band and the second wavelength band without the band gap therebetween. The path difference between the first split signal along the first signal path and the second split signal along the second signal path is within a threshold multipath interference compensation range.

Implementations of the disclosure may include one or more of the following optional features. In some implementations, the first wavelength and the second wavelength band each includes overlapping wavelengths that extend into both the first wavelength band and the second wavelength band. The first wavelength band may include a C-band of wavelengths and the second wavelength band may include an L-band of wavelengths.

In some examples, the method includes amplifying the first split signal by a first gain and amplifying the second split signal by a second gain. The method may also include receiving the first split signal through a first erbium doped fiber configured to amplify the first split signal by the first gain and receiving the second split signal through a second erbium doped fiber configured to amplify the second split signal by the second gain. The first erbium doped fiber may have a first length and the second erbium doped fiber may have a second length. The first length may be less than the second length.

In some implementations, delaying the first split signal by the threshold period of time includes receiving the first split signal through a length compensator. The length compensator may include a single mode optical fiber optically coupled to the first erbium doped fiber and having a third length sized to impart the delay in the first split signal by the threshold period of time relative to the second split signal at the combining of the delayed first split signal and the second split signal. The method may also include: splitting the combined signal into a first polarized signal and a second polarized signal; compensating a chromatic dispersion of each polarized signal; compensating a polarization mode dispersion of the polarized signals by limiting or reducing spreading of the first polarized signal and the second polarized signal; and compensating a multipath interference between the first polarized signal and the second polarized signal.

Compensating the chromatic dispersion of each polarized signal may include compensating for a difference in speed of wavelength components of the first polarized signal and the second polarized signal. Compensating the polarization mode dispersion may include applying a differential delay to synchronize the compensated polarized signals. Compensating the multipath interference may include resolving a time delay between the first polarized signal and the second polarized signal caused by the path difference between the delayed first split signal and the second split signal.

Another aspect of the disclosure provides an optical system including a splitter, a gap compensator and a combiner. The splitter is configured to receive an optical signal having a first frequency band and a second frequency band and split the optical signal into a first split signal having the first frequency band and a second split signal having the second frequency band. The splitting results in a band gap between the first wavelength band and the second wavelength band. The gap compensator is optically coupled to the splitter and configured to delay the first split signal by a threshold period of time relative to the second split signal. The combiner is optically coupled to the gap compensator and configured to combine the delayed first split signal and the second split signal, resulting in a combined signal having the first wavelength band and the second wavelength band without the band gap therebetween. The path difference between the delayed first split signal and the second split signal is within a threshold multipath interference compensation range.

This aspect may include one or more of the following optional features. In some implementations, the first wavelength band and the second wavelength band each include overlapping wavelengths that extend into both the first wavelength band and the second wavelength band. The first wavelength band may include a C-band of wavelengths and the second wavelength band may include an L-band of wavelengths.

In some examples, the gap compensator includes a first erbium doped fiber, a single mode fiber and a second erbium doped fiber. The first erbium doped fiber may be optically coupled to the splitter and configured to amplify the first split signal by a first gain. The single mode fiber may be optically coupled to the first erbium doped fiber and have a length sized to impart the delay in the first split signal by the threshold period of time. The second erbium doped fiber may be optically coupled to the splitter and configured to amplify the second split signal by a second gain.

In some implementations, the system includes a digital coherent receiver coupled to the combiner. The digital coherent receiver may be configured to map an optical field of the optical signal into electronic signals corresponding to phase and quadrature field components. The digital coherent receiver may also include one or more of a polarization splitter, a chromatic dispersion compensator, or a polarization mode dispersion compensator. The polarization splitter may be configured to receive the combined signal and split the combined signal into a first polarized signal and a second polarized signal. The chromatic dispersion compensator may be optically coupled to the polarization splitter. The chromatic dispersion compensator may be configured to receive the first polarized signal and the second polarized signal and compensate the chromatic dispersion by limiting or reducing spreading of the first polarized signal and the second polarized signal. In some examples, the chromatic dispersion compensator is configured to compensate the chromatic dispersion of each polarized signal by compensating for a difference in speed of wavelength components of the first polarized signal and the second polarized signal. The polarization mode dispersion compensator may be optically coupled to the chromatic dispersion compensator. The polarization mode dispersion compensator may be configured to compensate the polarization mode dispersion by limiting or reducing spreading of the first polarized signal and the second polarized signal. The polarization mode dispersion compensator may be configured to compensate the polarization mode dispersion by applying a differential delay to synchronize the compensated split polarized signals.

In some implementations, the digital coherent receiver includes a digital signal processor. The digital signal processor may include a multipath interference compensator configured to resolve a time delay between the first polarized signal and the second polarized signal caused by the path difference between the delayed first split signal and the second split signal.

Yet another aspect of the disclosure provides a second optical system including a splitter, a gap compensator, and a combiner. The splitter is configured to receive an optical signal having a first frequency band and a second frequency band and split the optical signal into a first split signal having the first frequency band and a second split signal having the second frequency band. The splitting results in a band gap between the first wavelength band and the second wavelength band. The gap compensator is optically coupled to the splitter and configured to delay the first split signal by a threshold period of time relative to the second split signal. The gap compensator includes a first erbium doped fiber, a second erbium doped fiber and a single mode fiber. The first erbium doped fiber is optically coupled to the splitter and configured to amplify the first split signal by a first gain. The second erbium doped fiber is optically coupled to the splitter and configured to amplify the second split signal by a second gain. The first erbium doped fiber has a first length and the second erbium doped fiber has a second length greater than the first length. The single mode fiber is optically coupled to the first erbium doped fiber and has a third length sized to impart the delay in the first split signal by the threshold period of time. The combiner is optically coupled to the gap compensator and configured to combine the delayed first split signal and the second split signal, resulting in a combined signal having the first wavelength band and the second wavelength band without the band gap therebetween. The path difference between the delayed first split signal and the second split signal is within a threshold multipath interference compensation range.

This aspect may include one or more of the following optional features. In some implementations, the first wavelength band and the second wavelength band each include overlapping wavelengths that extend into both the first wavelength band and the second wavelength band. The first wavelength band may include a C-band of wavelengths and the second wavelength band may include an L-band of wavelengths.

In some examples, the system includes a digital coherent receiver coupled to the combiner and a digital signal processor in communication with the digital coherent receiver. The digital coherent receiver may be configured to map an optical field of the optical signal into electronic signals corresponding to phase and quadrature field components. The digital coherent receiver includes a digital signal processor configured to resolve a time delay between the first polarized signal and the second polarized signal caused by the path difference between the delayed first split signal and the second split signal.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A continued growth of information and communication has led to high capacity optical fiber communication systems, where a Shannon limit determines a maximum capacity of communications transmitted through any given optical fiber. Efficient use of bandwidth, however, can increase the capacity. For example, L-band communication (e.g., 1565-1625 nm wavelength) can be added to commercial C-band systems (e.g., 1530-1565 nm wavelength) to increase the capacity. The combination of the C-band and the L-band generally results in a band gap G between the C-band and the L-band due to optical filter properties. The resulting band gap G causes the loss of about 0.5 THz of valuable spectrum.

The present disclosure provides solutions for reducing the band gap between different bands of spectrum, including, but not limited, to the C-band and the L-band.

Figure 1:
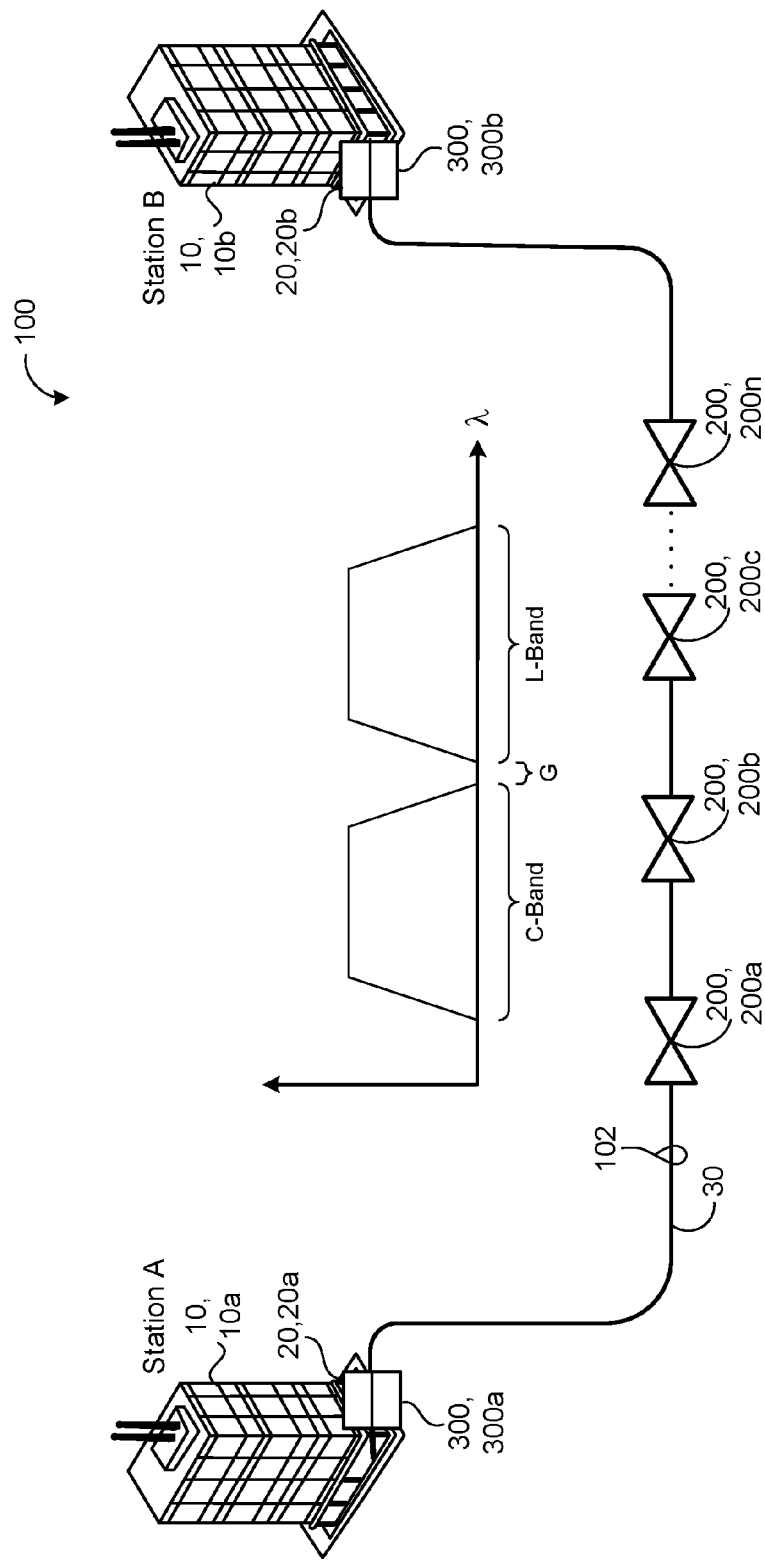
FIG. 1 is a schematic view of an example optical communication arrangement.

Referring to FIG. 1, an optical communication system 100 includes first and second trunk terminals 10, 10a, 10b (also referred to as stations) coupled to a communication trunk 30. The communication trunk 30 includes one or more optical spectrum amplification systems 200, 200a-n for amplifying an optical signal 102 communicated between the first and second trunk terminals 10a, 10b. Each trunk terminal 10a, 10b includes a corresponding optical transmitter 20, 20a, 20b configured to transmit an optical signal 102 and a corresponding optical receiver 300, 300a, 300b configured to receive and process an optical signal 102.

Figure 2A:
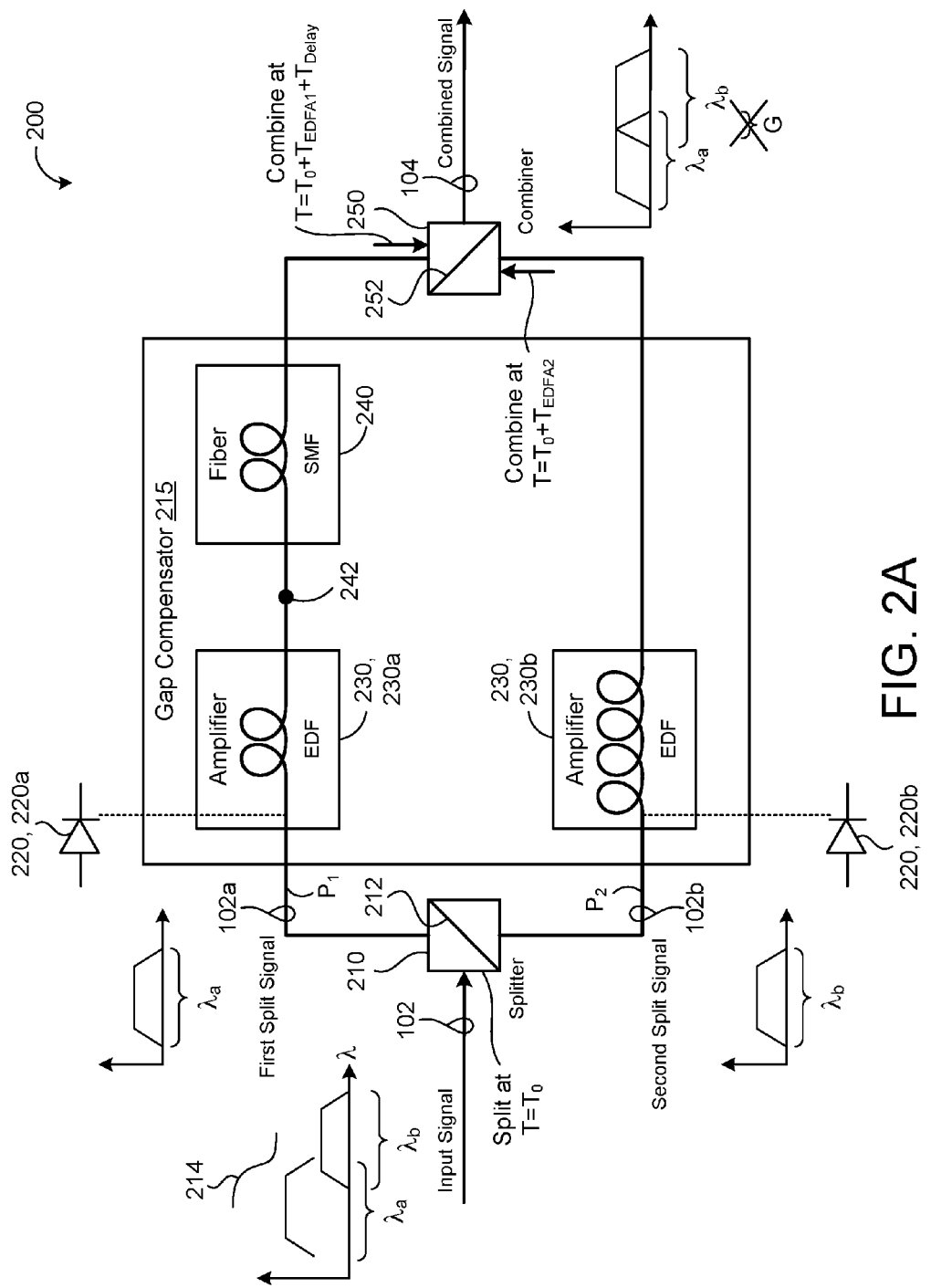
FIG. 2A is a schematic view of an example spectrum amplification system.
Figure 2B:
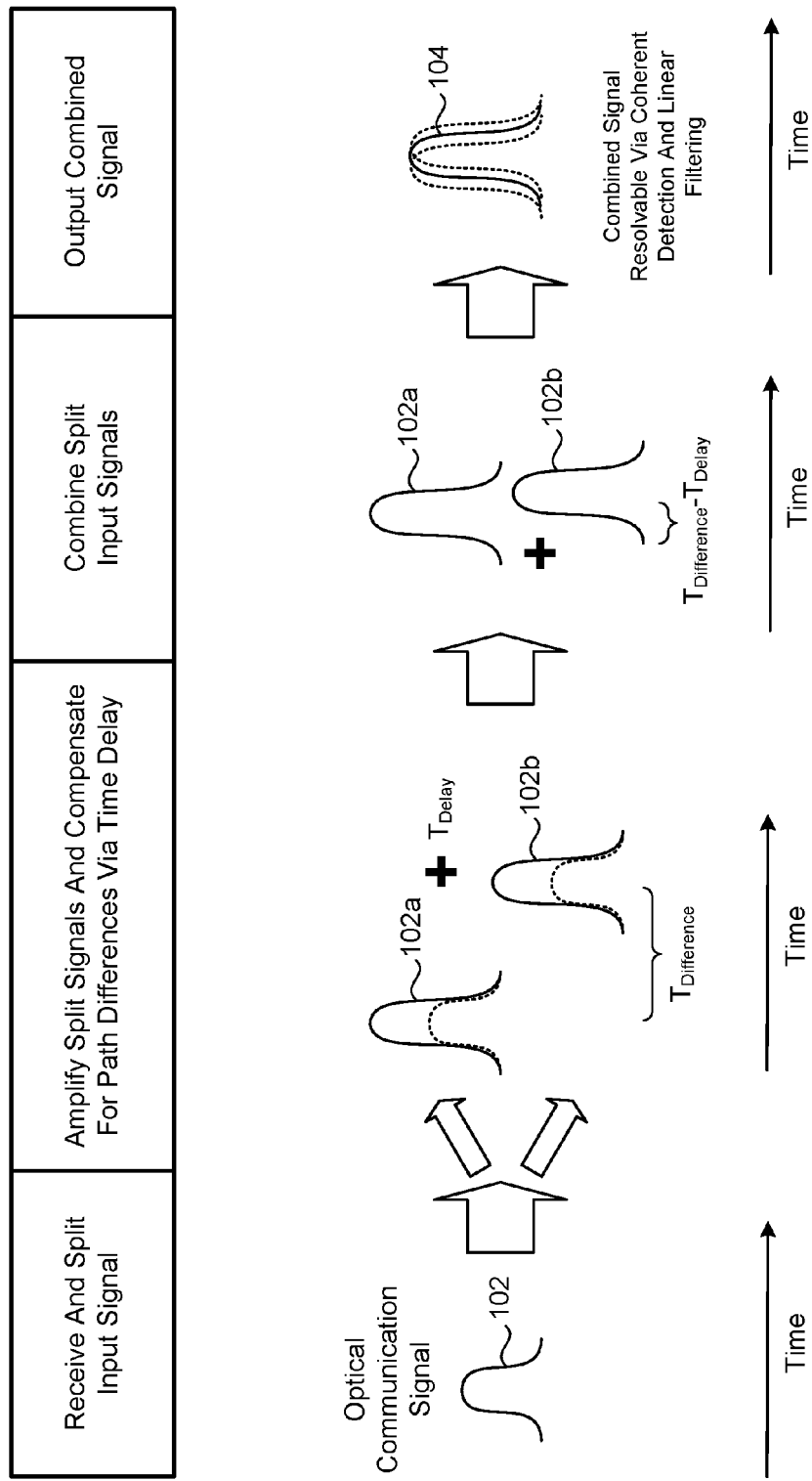
FIG. 2B provides a schematic view of operation of the spectrum amplification system.

FIG. 2A provides a schematic view of an example spectrum amplification system 200 configured to reduce the band gap G between different bands of spectrum, including, but not limited, to the C-band and the L-band. FIG. 2B provides a schematic view of operation of the spectrum amplification system 200. In some implementations, the spectrum amplification system 200 includes a splitter 210 that receives an input signal 102. The input signal 102 is an optical signal having a first frequency band corresponding to a first band of wavelengths $\lambda_a$ and a second frequency band corresponding to second band of wavelengths $\lambda_b$. In some implementations, the first band of wavelengths $\lambda_a$ corresponds to the C-band, optionally with spectrum extended into the L-Band; and the second band of wavelengths $\lambda_b$ corresponds to the L-band, optionally with spectrum extended into the C-Band. The C-band has a wavelength range of approximately 1530 to 1565 nm. The. The L-band has a wavelength range of approximately 1565 to 1625 nm.

In the example shown, the splitter 210 includes a dielectric mirror 212 having a filter profile 214 with a transition bandwidth (e.g., of about 5 nm) that reflects portions of the input signal 102 having C-band wavelengths while allowing other portions of the input signal 102 having L-band wavelengths to pass through/be transmitted by the dielectric mirror 212, thereby splitting the input signal 102 into the first and second split signals 102a, 102b. The dielectric mirror 212 exhibits a transition while changing characteristics between reflecting and transmitting spectrum of different wavelengths $\lambda$ based on the filter profile 214. The transition may result in a gap or loss of spectrum (e.g., of about 5 nm or about 0.5 THz) between the first and second split signals 102a, 102b (e.g., between the C- and L-bands of spectrum). A band gap G is an energy gap in spectrum where energy is diminished or does not exist.

The splitter 210 divides the input signal 102 into a first split signal 102a and a second split signal 102b, which travel along corresponding first and second paths $P_1$, $P_2$. The first and second paths $P_1$, $P_2$ have corresponding path lengths. In some implementations, the first split signal 102a includes the first band of wavelengths $\lambda_a$ and the second split signal 102b includes the second band of wavelengths $\lambda_b$. Since the first split signal 102a and the second split signal 102b travel along different paths $P_1$, $P_2$, the two split signals 102a, 102b may arrive at a common destination at different times, which may result in a loss of data. For example, a system may fail to resolve bits of data arriving at the common destination at different times. Systems including a linear filter, however, may resolve the bits of data arriving at the common destination at different times when a difference of time between the bits is within a threshold time period. In other words, the linear filter can correct any linear effects or linear penalties when an overall time delay difference resulting from the first and second split signals 102a, 102b travelling along the respective first and second paths $P_1$, $P_2$ is within a threshold time delay difference. The spectrum amplification system 200 advantageously compensates for optical path differences between the first split signal 102a and the second split signal 102b, so that a combined signal 104 resulting from the combination of the first split signal 102a and the second split signal 102b can be detected by a coherent optical receiver and directed to a digital signal processor (DSP) that can compensate for multipath interference within its computational capabilities.

The spectrum amplification system 200 further includes a gap compensator 215 optically coupled to the splitter 210 to keep the first and second split signals 102a, 102b travelling along the respective first and second paths $P_1$, $P_2$ is within the threshold time delay difference. In some implementations, the gap compensator 215 functions as a broadband amplifier that amplifies the spectrum between the first and second bands of wavelengths $\lambda_a$, $\lambda_b$, separately, and imparts a time delay relatively between the first split signal 102a and the second split signal 102b to remove any band gap G between the first and second bands of wavelengths $\lambda_a$, $\lambda_b$.

The gap compensator 215, in some implementations, includes one or more amplifiers 220, 230 to separately amplify the first and second split signals 102a, 102b. In the example shown, the gap compensator 215 optionally includes first and second signal pumps 220a, 220a (e.g., pump lasers or diodes) to amplify the corresponding first and second split signals 102a, 102b. Additionally or alternatively, the gap compensator 215 includes a first erbium-doped fiber amplifier (EDFA) 230a configured to amplify the first split signal 102a and a second EDFA 230b configured to amplify the second split signal 102b. In the example shown, the first EDFA 230a serves as a C-Band amplifier with spectrum extended into the L-Band, and the second EDFA 230b serves as an L-Band amplifier with spectrum extended into the C-Band. A length, $Length_L$, of the second EDFA 230b may be longer than a length, $Length_C$, of the first EDFA 230a, resulting in a time delay imparted on the second split signal 102b relative the first split signal 102a. For example, a first time period, $T_{EDFA1}$, for the first split signal 102a to travel through the first EDFA 230a may be less than a second time period, $T_{EDFA2}$, for the second split signal 102a to travel through the second EDFA 230b.

To bring the first and second split signals 102a, 102b closer in time relative to each other, the gap compensator 215 imparts a time delay, $T_{Delay}$, to the first split signal 102a The gap compensator 215 further includes a length compensator 240 optically coupled to the amplifier(s) 220a, 230a along the first path $P_1$ to bring the first and second split signals 102a, 102b closer in time relative to each other. In the example shown, the length compensator 240 is optically coupled to the first EDFA 230a. In some implementations, the length compensator 240 is a single mode fiber (SMF) that provides a passive time delay to the amplified first split signal 102a. A splice point 242 may join the amplifier 220a, 230a along the first path $P_1$ to the length compensator 240 (e.g., the SMF 240 is spliced to the first EDFA 230a). The length compensator 240 lengthens the first path $P_1$, thereby imparting a time delay, $T_{Delay}$, to the first split signal 102a. The time delay, $T_{Delay}$, is dependent on the length of the SMF 240. Moreover, the time delay, $T_{Delay}$, is relative to the second split signal 102b at a time T of combining of the delayed first split signal 102a and the second split signal 102b by a combiner 250 optically coupled to the gap compensator 215. In particular, the combiner 250 receives and combines the delayed, amplified first split signal 102a and the amplified second split signal 102b into a combined signal 104, for example, at a time T, where the first split signal 102a arrives at the combiner 250 at $T=T_0+T_{EDFA1}+T_{Delay}$ and the second split signal 102b arrives at the combiner 250 at $T=T_0+T_{EDFA2}$. By adding the time delay $T_{Delay}$ to the first split signal 102a, the delayed first split signal 102a is separated from the second split signal 102b by a reduced period of time relative to each other, thus substantially offsetting a difference in time periods ($T_{EDFA2}-T_{EDFA1}$) for the first split signal 102a to travel through the first EDFA 230a and for the second split signal 102a to travel through the second EDFA 230b.

By reducing the delay between first and second split signals 102a, 102b, the delayed first split signal 102a and the second split signal 102b can be resolved by a digital signal processor or any other device that converts the optical signal to an electrical signal. Signal integrity of the original input signal 102 is retained after amplification by the gap compensator 215 despite the reduction of any band gap G between wavelength bands $\lambda_a$, $\lambda_b$. The resulting combined signal 104 does not have any band gap G between wavelength bands $\lambda_a$, $\lambda_b$ or the band gap G is substantially reduced.

The combined signal 104 is a linearly combined signal that may have linear interference due to the inherent properties of the gap compensator 215 and/or the combiner 250. The combined signal 104 can be further split and filtered with linear filtering. The filtered signals may be subsequently processed by a digital signal processor.

Figure 2C:
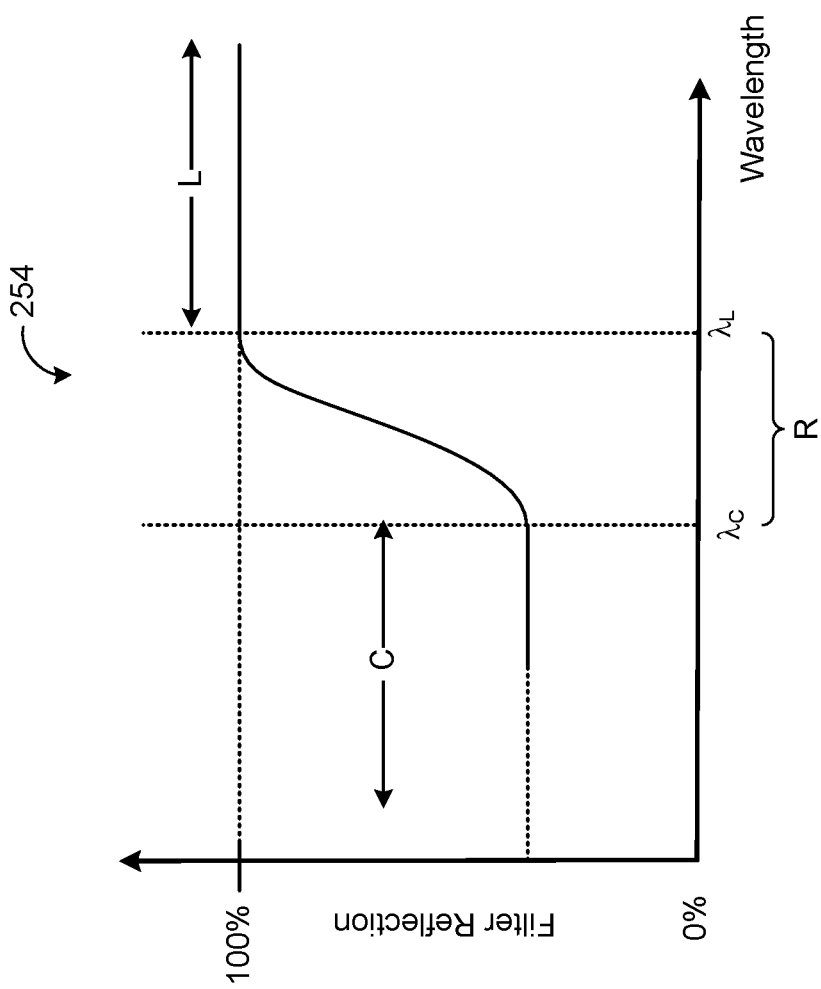
FIG. 2C is a plot of an example filter profile.

Referring to FIGS. 2A and 2C, FIG. 2C illustrates a filter profile 254 of a portion of the combiner 250 that processes the amplified second split signal 102b (L-band). The aforementioned portion of the combiner 250 includes, in some implementations, a dielectric mirror 252 with the filter profile 254. The filter profile 254 of the dielectric mirror 252 results in the combiner 250 blocking spectrum below a cutoff wavelength $\lambda_C$ in the C-band. The filter profile 254 shows partial transmission in the transition spectral window R (e.g., approximately 5 nm) between the cutoff wavelength $\lambda_C$ and a band wavelength $\lambda_L$ (e.g., a starting wavelength of the L-band). The filter profile 254 provides flat transmission in L-band, and flat reflection in C-band. In the some examples, the splitter 210 and the combiner 250 have the same filter profiles 214, 254.

Figure 3A:
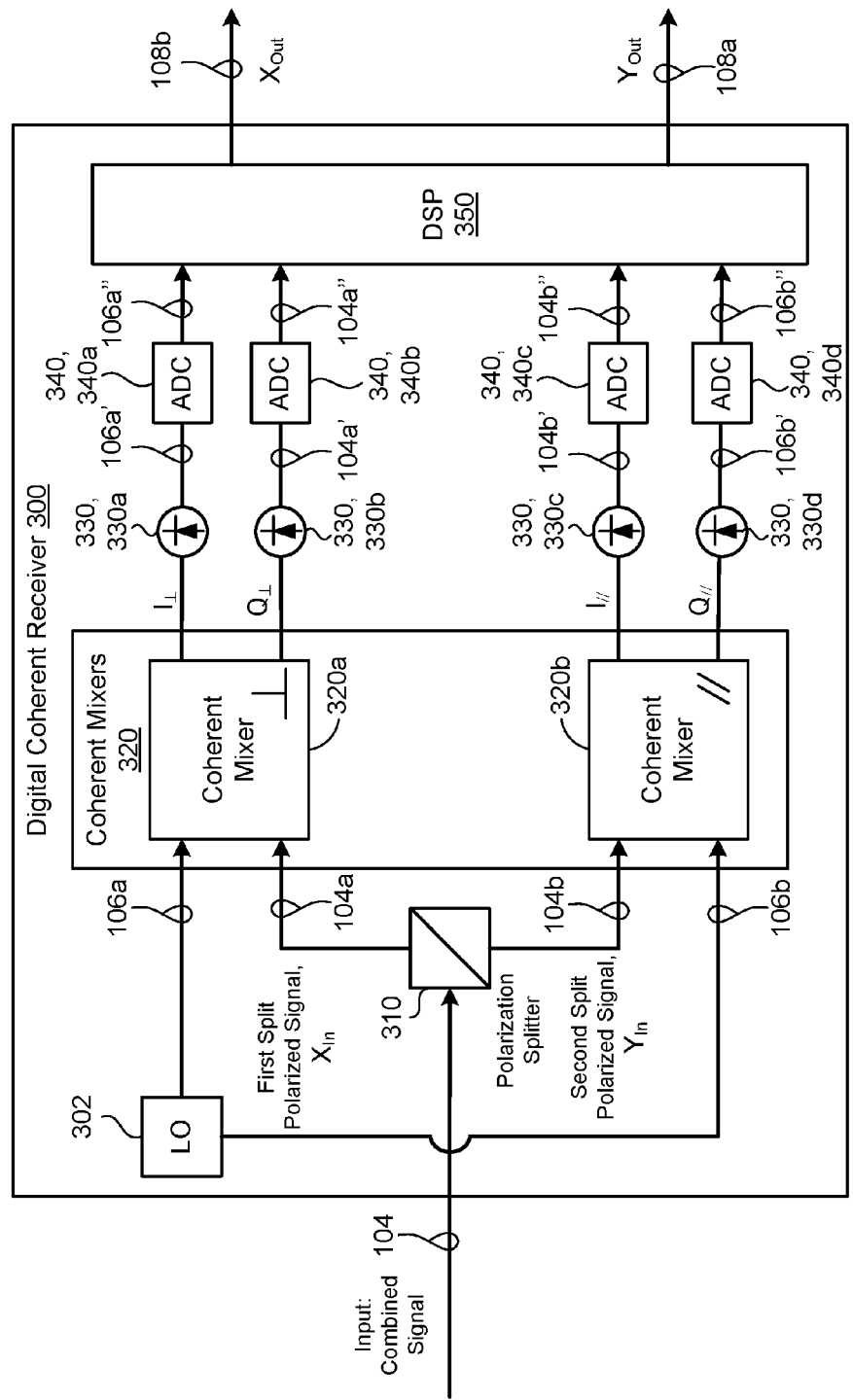
FIG. 3A is a schematic view of an example digital coherent receiver.

Referring to FIGS. 1 and 3A, in some implementations, the receiver 300, 300a, 300b of each trunk terminal (station) 10, 10a, 10b is a digital coherent receiver configured to receive and process the optical signal, which may be a coherent transmission. A coherent transmissions are transmissions where the receiver knows what type of data is being sent. Coherency implies a strict timing mechanism. After propagation through multiple spans of optical fiber 30 and one or more amplifications by the one or more spectrum amplification systems 200, the amplified optical signal 104 becomes the input of digital coherent receiver 300, 300a, 300b of the respective trunk terminal 10, 10a, 10b. The digital coherent receiver 300 is configured to convert an optical field of the amplified optical signal 104 into an electrical domain through heterodyne detection (a cross term of quadratic detection of the sum of a local oscillator and electric fields of the signal). In the example shown, the digital coherent receiver 300 includes a polarization splitter 310 configured to split the combined signal 104 (i.e., the output of the one or more spectrum amplification systems 200, 200a-n) into a first split polarized signal ($\lambda_{in}$) 104a and a second split polarized signal ($Y_{in}$) 104b. The polarization splitter 310 may be a cube made by adjoining two triangular glass prisms, in some implementations. The first split polarized signal 104a and the second split polarized signal 104b represent different light beams with different polarizations. First and second coherent mixers 320, 320a, 320b receive the corresponding first and second split polarized signal 104a, 104b along with corresponding first and second local oscillator signals 106a, 106b from a local oscillator 302. The coherent mixers 320, 320a, 320b combines the incoming signals (i.e., the first and second split polarized signal 104a, 104b) with the first and second local oscillator signals 106a, 106b to generate light states $I_\perp$, $Q_\perp$, $I_{//}$, $Q_{//}$ in complex-field space. Photodiodes 330, 330a-d receive and convert the light states $I_\perp$, $Q_\perp$, $I_{//}$, $Q_{//}$ to corresponding analog signals 104a', 104b', 106a', 106b'. Analog-to-digital converters (ADCs) 340, 340a-d convert the analog signals 104a', 104b', 106a', 106b' to corresponding digital signals 104a", 104b", 106a", 106b". A digital signal processor (DSP) 350 processes the digital signals 104a", 104b", 106a", 106b" and outputs a first electrical signal ($X_{out}$) 108a and a second electrical signal ($Y_{out}$) 108b.

When a common laser for wavelength division multiplexing (WDM) is used, a shift (offset) in optical frequency may be generated within the range of wavelength accuracy between the transmitter 20 (e.g., a laser) and the local oscillator 302 (e.g., another laser) of the receiver 300. The frequency offset can be up to several GHz. The DSP 350 is configured to compensate for the frequency offset. In addition to compensating for the frequency offset, the DSP 350 compensates for a phase difference between the transmitter 20 and the local oscillator 302 (during a carrier phase estimation process) to prepare for identification judgment (e.g., decisions).

Figure 3B:
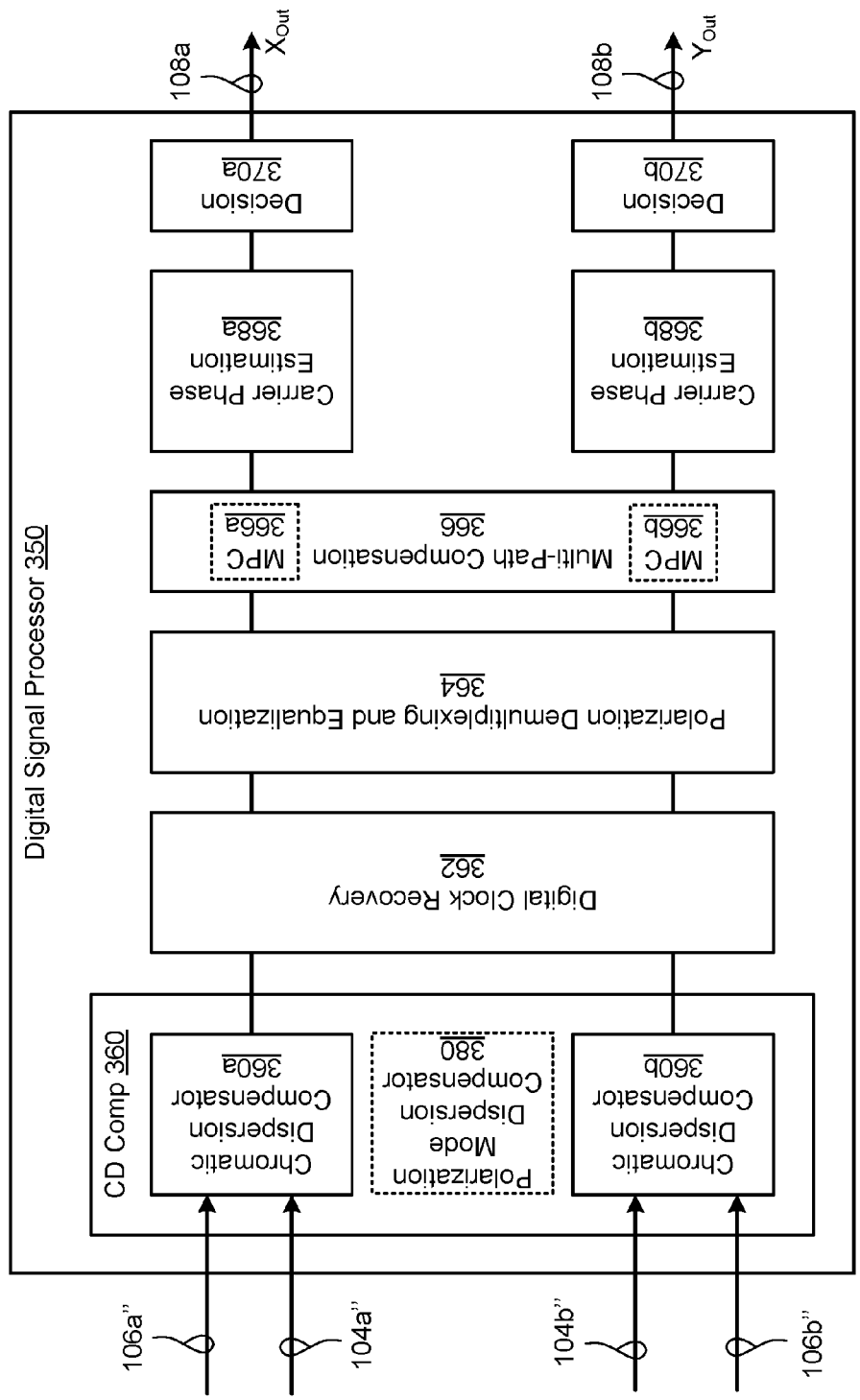
FIG. 3B is a schematic view of an example digital signal processor of a digital coherent receiver.

FIG. 3B is a schematic view of an example DSP 350. In the example shown, the DSP 350 includes a chromatic dispersion compensator 360 (e.g., first and second chromatic dispersion compensators 360a, 360b) that receives the digital signals 104a", 104b", 106a", 106b" from the ADCs 340, 340a-d. The chromatic dispersion compensator(s) 360, 360a, 360b compensate for signal spreading. Chromatic dispersion can occur during transmission of light pulses at high date rates, resulting in errors and/or loss of information. The speeds of the wavelength components are dependent on a refractive index within the optical fiber; the refractive index may vary with wavelength. After chromatic dispersion compensation, the DSP 350 processes the signals via digital clock recovery 362, polarization demultiplexing and equalization 364, multi-path compensation 366, carrier phase estimation 368a, 368b, and decision(s) 370a, 370b.

In some implementations, a polarization mode dispersion (PMD) compensator 380 is in communication with the chromatic dispersion compensators 360a, 360b. The PMD compensator 380 compensates for modal dispersion in different polarizations of light caused by the chromatic dispersion compensators 360a, 360b. The modal dispersion may be caused by different light polarizations traveling within the fiber at different speeds instead of the same speed. The differences in speed may be caused by random imperfections within an optical fiber that break a circular symmetry. This causes two polarizations to propagate at different speeds and require polarization mode dispersion compensation. Specifically, the two polarization components of a signal may separate, causing pulses to spread and overlap. The random imperfections may cause pulse spreading effects including random walk, resulting in a mean polarization-dependent time-differential.

The multipath interference compensator 366 includes multipath interference compensators (MPCs) 366a, 366b. The components outputted by the digital coherent receiver 300 (i.e., the digital signals 104a", 104b", 106a", 106b") are within a threshold capability of the multipath compensator 366 because of the compensation provided based at least in part by the gap compensator 215. The first multipath interference compensator 366a outputs a first electrical signal ($X_{out}$) 108a, whereas the second multipath interference compensator 366b outputs a second electrical signal ($Y_{out}$) 108b.

Linear interference is created in part by overlapping C-band and L-band amplification by the first amplifier 220a, 230a and the second amplifier 220b, 230b.

The optical signal 102a at the end of the first path $P_1$ (Path C) can be represented as:

$$Int(C) = Signal_{In}(\lambda,t) * Filter(\lambda) * Gain_C(\lambda, Length_C/C_{light}) * T_{Delay}(Length_L/C_{light} - Length_C/C_{light}) \quad (1)$$

where Int(C) is the signal at the end of Path C, $Signal_{In}(\lambda, t)$ is the power of the input signal 102 as a function of a given wavelength λ and time t, Filter(λ) is a filter coefficient based on the given wavelength λ, $Gain_C$ is a first gain of the first EDFA 230a, $Length_C$ is a length of the first EDFA 230a (e.g., the length of the C-Band EDFA), $Length_L$ is a length of the second EDFA 230b (e.g., the length of the L-Band EDFA), $C_{Light}$ is the speed of light, and $T_{Delay}$ is a time delay (e.g., the time delay imparted by the length compensator 240). In some implementations, $Length_L$ is between about 1-10 meters long (e.g., between 2-5 meters), and $Length_L$ is tens of meters long, for example, between about 10-100 meters long or between 10-50 meters long. The time delay $T_{Delay}$ may be based on a difference in lengths between the first path $P_1$ and the second path $P_2$, and in particular, between the length $Length_L$ of the second EDFA 230b (e.g., the length of the L-Band EDFA) and the length $Length_C$ of the first EDFA 230a (e.g., the length of the C-Band EDFA). The time delay $T_{Delay}$ reduces the relative time delay between first and second split signals 102a, 102b so that the combined signal 104, resulting from the combination of the delayed first split signal 102a and the second split signal 102b, can be resolved by the multipath compensator 366.

The optical signal 102b at the end of the second path $P_2$ (Path L) can be represented as:

$$Int(L) = Signal_{In}(\lambda,t) * (1 - Filter(\lambda)) * Gain_L(\lambda, Length_L/C_{light}) \quad (2)$$

where Int(L) is the signal at the end of Path L, $Signal_{In}(\lambda, t)$ is the power of the input signal 102 as a function of the given wavelength λ and time t, Filter(λ) is the filter coefficient based on the given wavelength λ, $Gain_L$ is a second gain of the second EDFA 220b, $Length_L$ is the length of the second EDFA 220b (e.g., the length of the L-Band EDFA), and $c_{Light}$ is the speed of light.

The combined signal 104 can be represented as:

$$Signal_{Out}(\lambda,t) = Signal_{In}(\lambda,t) * [Filter(\lambda)^2 * Gain_C(\lambda, Length_C/C_{Light}) * T_{Delay}(Length_L/C_{Light} - Length_C/C_{Light}) + (1-Filter(\lambda))^2 * Gain_L(\lambda, Length_L/C_{Light})] \quad (3)$$

where $Signal_{Out}(\lambda, t)$ is the power of the combined signal 104, assuming the same filter profiles for the splitter 210 and the combiner 250. A linear filter, such as the multipath compensator 366 may use the linear combination of signals in Equation 3 to resolve any linear effects or linear penalties caused by the separation of the input signal 102 into the first and second split signals 102a, 102b, and the subsequent rejoining thereof into the combined signal 104. The function of the multipath compensator 366 can be folded into polarization demultiplexing and equalization 364 itself, if it has sufficient memory.

Figure 4:
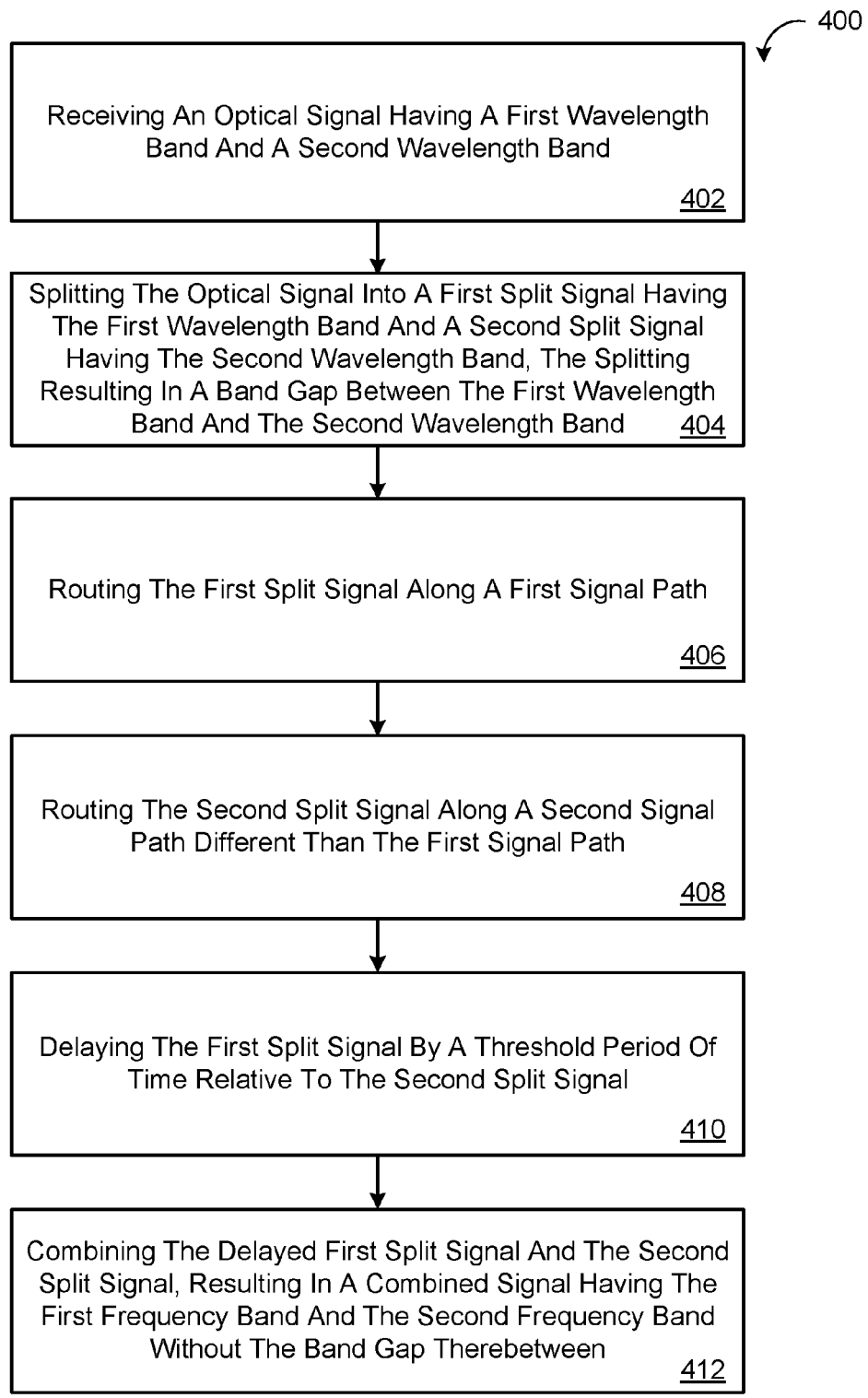
FIG. 4 is a flowchart providing an example arrangement of operations for a method of amplifying overlapping spectrum.

FIG. 4 provides a schematic view of an exemplary arrangement of operations for a method 400 of amplifying overlapping spectrum. At operation 402, the method 400 includes receiving an optical signal 102 having a first wavelength band $\lambda_a$ and a second wavelength band $\lambda_b$. At operation 404, the method 400 further includes splitting the optical signal 102 into a first split signal 102a having the first wavelength band $\lambda_a$ and a second split signal 102b having the second wavelength band $\lambda_b$, the splitting resulting in a band gap G between the first wavelength band $\lambda_a$ and the second wavelength band $\lambda_b$. At operation 406, the method 400 further includes routing the first split signal 102a along a first signal path $P_1$. At operation 408, the method 400 includes routing the second split signal 102b along a second signal path $P_2$ different than the first signal path $P_1$. At operation 410, the method 400 includes delaying the first split signal 102a by a threshold period of time relative to the second split signal 102b. At operation 412, the method 400 includes combining the delayed first split signal 102a and the second split signal 102b, resulting in a combined signal 104 having the first frequency band and the second frequency band without the band gap G therebetween. The path difference between the first split signal 102a along the first signal path $P_1$ and the second split signal 102b along the second signal path $P_2$ is within a threshold multipath interference compensation range.

In some implementations, the first wavelength and the second wavelength band $\lambda_a$, $\lambda_b$ each includes overlapping wavelengths that extend into both the first wavelength band and the second wavelength band $\lambda_a$, $\lambda_b$. The first wavelength band $\lambda_a$ may include a C-band of wavelengths and the second wavelength band $\lambda_b$ may include an L-band of wavelengths.

In some examples, the method 400 includes amplifying the first split signal 102a by a first gain and amplifying the second split signal 102b by a second gain. The method 400 may also include receiving the first split signal 102a through a first erbium doped fiber 230a configured to amplify the first split signal 102a by the first gain and receiving the second split signal 102b through a second erbium doped fiber 230b configured to amplify the second split signal 102b by the second gain. The first erbium doped fiber 230a may have a first length and the second erbium doped fiber 230b may have a second length. The first length may be less than the second length. In such instances, routing the first split signal 102a through a length compensator 240 results in a first path length of the first signal path $P_1$ to be equal or substantially equal to a second path length of the second signal path $P_2$.

In some implementations, delaying the first split signal 102a by the threshold period of time includes receiving the first split signal 102a through the length compensator 240. The length compensator 240 may include a single mode optical fiber 240 optically coupled to the first erbium doped fiber 230a and having a third length sized to impart the delay in the first split signal 102a by the threshold period of time relative to the second split signal 102b at the combining of the delayed first split signal 102a and the second split signal 102b. The method 400 may also include: splitting the combined signal 104 into a first polarized signal 104a and a second polarized signal 104b; compensating a chromatic dispersion of each polarized signal 104a, 104b; compensating a polarization mode dispersion of the polarized signals 104a, 104b (e.g., by limiting or reducing spreading of the first polarized signal 104a and the second polarized signal

104b); and compensating a multipath interference between the first polarized signal 104a and the second polarized signal 104b.

Compensating the chromatic dispersion of each polarized signal 104a, 104b may include compensating for a difference in speed of wavelength components of the first polarized signal 104a and the second polarized signal 104b. Compensating the polarization node dispersion may include applying a differential delay to synchronize the compensated polarized signals 104. Compensating the multipath interference may include resolving a time delay between the first polarized signal 104a and the second polarized signal 104b caused by the path difference between the delayed first split signal 102a and the second split signal 102b.

The system 100 and method 400 described above may be applied to C/L band terrestrial wide-band line system (WLS), submarine optical communication cable applications or any other type of application where optical transmission is performed.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving an optical signal having a first wavelength band and a second wavelength band;
splitting the optical signal into a first split signal having the first wavelength band and a second split signal having the second wavelength band, the splitting resulting in a band gap between the first wavelength band and the second wavelength band;
routing the first split signal along a first signal path;
routing the second split signal along a second signal path different than the first signal path;
delaying the first split signal by a threshold period of time relative to the second split signal;
combining the first split signal and the second split signal, resulting in a combined signal having the first wavelength band and the second wavelength band without the band gap therebetween, wherein a path difference between the first split signal along the first signal path and the second split signal along the second signal path is within a threshold multipath interference compensation range;
splitting the combined signal into a first polarized signal and a second polarized signal;
compensating a chromatic dispersion of each polarized signal;
compensating a polarization mode dispersion of the polarized signals by limiting or reducing spreading of the first polarized signal and the second polarized signal; and
compensating a multipath interference between the first polarized signal and the second polarized signal.

2. The method of claim 1, wherein the first wavelength band and the second wavelength band each comprises overlapping wavelengths that extend into both the first wavelength band and the second wavelength band.

3. The method of claim 1, wherein the first wavelength band comprises a C-band of wavelengths and the second wavelength band comprises an L-band of wavelengths.

4. The method of claim 1, further comprising:
amplifying the first split signal by a first gain; and
amplifying the second split signal by a second gain.

5. The method of claim 4, further comprising:
receiving the first split signal through a first erbium doped fiber configured to amplify the first split signal by the first gain; and
receiving the second split signal through a second erbium doped fiber configured to amplify the second split signal by the second gain.

6. The method of claim 5, wherein the first erbium doped fiber has a first length and the second erbium doped fiber has a second length, the first length being less than the second length.

7. The method of claim 6, wherein delaying the first split signal by the threshold period of time comprises receiving the first split signal through a length compensator, the length compensator comprising a single mode optical fiber optically coupled to the first erbium doped fiber and having a third length sized to impart the delay in the first split signal by the threshold period of time relative to the second split signal at the combining of the delayed first split signal and the second split signal.

8. The method of claim 1, wherein compensating the chromatic dispersion of each polarized signal comprises compensating for a difference in speed of wavelength components of the first polarized signal and the second polarized signal, and wherein compensating the polarization mode dispersion comprises applying a differential delay to synchronize the compensated polarized signals.

9. The method of claim 1, wherein compensating the multipath interference comprises resolving a time delay between the first polarized signal and the second polarized signal caused by the path difference between the delayed first split signal and the second split signal.

10. An optical system comprising:
a splitter configured to:
receive an optical signal having a first wavelength band and a second wavelength band; and
split the optical signal into a first split signal having the first wavelength band and a second split signal having the second wavelength band, the splitting resulting in a band gap between the first wavelength band and the second wavelength band;
a gap compensator optically coupled to the splitter and configured to delay the first split signal by a threshold period of time relative to the second split signal, wherein the gap compensator comprises:
a first erbium doped fiber optically coupled to the splitter and configured to amplify the first split signal by a first gain;
a single mode fiber optically coupled to the first erbium doped fiber and having a length sized to impart the delay in the first split signal by the threshold period of time; and
a second erbium doped fiber optically coupled to the splitter and configured to amplify the second split signal by a second gain; and
a combiner optically coupled to the gap compensator and configured to combine the delayed first split signal and the second split signal, resulting in a combined signal having the first wavelength band and the second wavelength band without the band gap therebetween, wherein a path difference between the delayed first split signal and the second split signal is within a threshold multipath interference compensation range,
wherein the combined signal has a power determined as:

$$\text{Signal}_{Out}(\lambda,t) = \text{Signal}_{In}(\lambda,t) * [\text{Filter}(\lambda)^2 * \text{Gain}_C(\lambda, \text{Length}_C/C_{Light}) * T_{Delay}(\text{Length}_L/C_{Light} - \text{Length}_C/C_{Light}) + (1-\text{Filter}(\lambda))^2 * \text{Gain}_L(\lambda, \text{Length}_L/C_{Light})]$$

wherein $\text{Signal}_{Out}(\lambda, t)$ is the power of the combined signal, $\text{Signal}_{In}(\lambda, t)$ is the power of the received signal as a function of a given wavelength $\lambda$ and time t, $\text{Filter}(\lambda)$ is a filter coefficient based on the given wavelength $\lambda$, $\text{Gain}_C$ is a first gain of the first erbium doped fiber, $\text{Gain}_L$ is a second gain of the second erbium doped fiber, $\text{Length}_C$ is a length of the first erbium doped fiber, $\text{Length}_L$ is a length of the second erbium doped fiber, $C_{Light}$ is the speed of light in fiber, and $T_{Delay}$ is the time delay.

11. The optical system of claim 10, wherein the first wavelength band and the second wavelength band each comprises overlapping wavelengths that extend into both the first wavelength band and the second wavelength band.

12. The optical system of claim 10, wherein the first wavelength band comprises a C-band of wavelengths and the second wavelength band comprises an L-band of wavelengths.

13. The optical system of claim 10, further comprising a digital coherent receiver coupled to the combiner, the digital coherent receiver configured to map an optical field of the optical signal into electronic signals corresponding to phase and quadrature field components.

14. The optical system of claim 13, wherein the digital coherent receiver comprises a polarization splitter configured to receive the combined signal and split the combined signal into a first polarized signal and a second polarized signal.

15. An optical system comprising:
a splitter configured to:
receive an optical signal having a first wavelength band and a second wavelength band; and
split the optical signal into a first split signal having the first wavelength band and a second split signal having the second wavelength band, the splitting resulting in a band gap between the first wavelength band and the second wavelength band;
a gap compensator optically coupled to the splitter and configured to delay the first split signal by a threshold period of time relative to the second split signal;
a combiner optically coupled to the gap compensator and configured to combine the delayed first split signal and the second split signal, resulting in a combined signal having the first wavelength band and the second wavelength band without the band gap therebetween; and
a digital coherent receiver coupled to the combiner, the digital coherent receiver configured to map an optical field of the optical signal into electronic signals corresponding to phase and quadrature field components,
wherein a path difference between the delayed first split signal and the second split signal is within a threshold multipath interference compensation range, and
wherein the digital coherent receiver comprises a polarization splitter configured to receive the combined signal and split the combined signal into a first polarized signal and a second polarized signal, and the digital coherent receiver comprises a digital signal processor comprising a multipath interference compensator configured to resolve a time delay between the first polarized signal and the second polarized signal caused by the path difference between the delayed first split signal and the second split signal.

16. An optical system comprising:
a splitter configured to:
receive an optical signal having a first wavelength band and a second wavelength band; and
split the optical signal into a first split signal having the first wavelength band and a second split signal having the second wavelength band, the splitting resulting in a band gap between the first wavelength band and the second wavelength band;
a gap compensator optically coupled to the splitter and configured to delay the first split signal by a threshold period of time relative to the second split signal, the gap compensator comprising:
a first erbium doped fiber optically coupled to the splitter and configured to amplify the first split signal by a first gain, the first erbium doped fiber having a first length;
a second erbium doped fiber optically coupled to the splitter and configured to amplify the second split signal by a second gain, the second erbium doped fiber having a second length greater than the first length; and a single mode fiber optically coupled to the first erbium doped fiber and having a third length sized to impart the delay in the first split signal by the threshold period of time; and a combiner optically coupled to the gap compensator and configured to combine the delayed first split signal and the second split signal, resulting in a combined signal having the first wavelength band and the second wavelength band without the band gap therebetween, wherein a path difference between the delayed first split signal and the second split signal is within a threshold multipath interference compensation range; and a digital coherent receiver coupled to the combiner, the digital coherent receiver configured to map an optical field of the optical signal into electronic signals corresponding to phase and quadrature field components, the digital coherent receiver comprises a polarization splitter configured to receive the combined signal and split the combined signal into a first polarized signal and a second polarized signal, and the digital coherent receiver comprising a digital signal processor configured to resolve a time delay between the first polarized signal and the second polarized signal caused by the path difference between the delayed first split signal and the second split signal.

17. The optical system of claim 16, wherein the first wavelength band and the second wavelength band each comprises overlapping wavelengths that extend into both the first wavelength band and the second wavelength band.

18. The optical system of claim 16, wherein the first wavelength band comprises a C-band of wavelengths and the second wavelength band comprises an L-band of wavelengths.

* * * * *